Patented Feb. 24, 1931

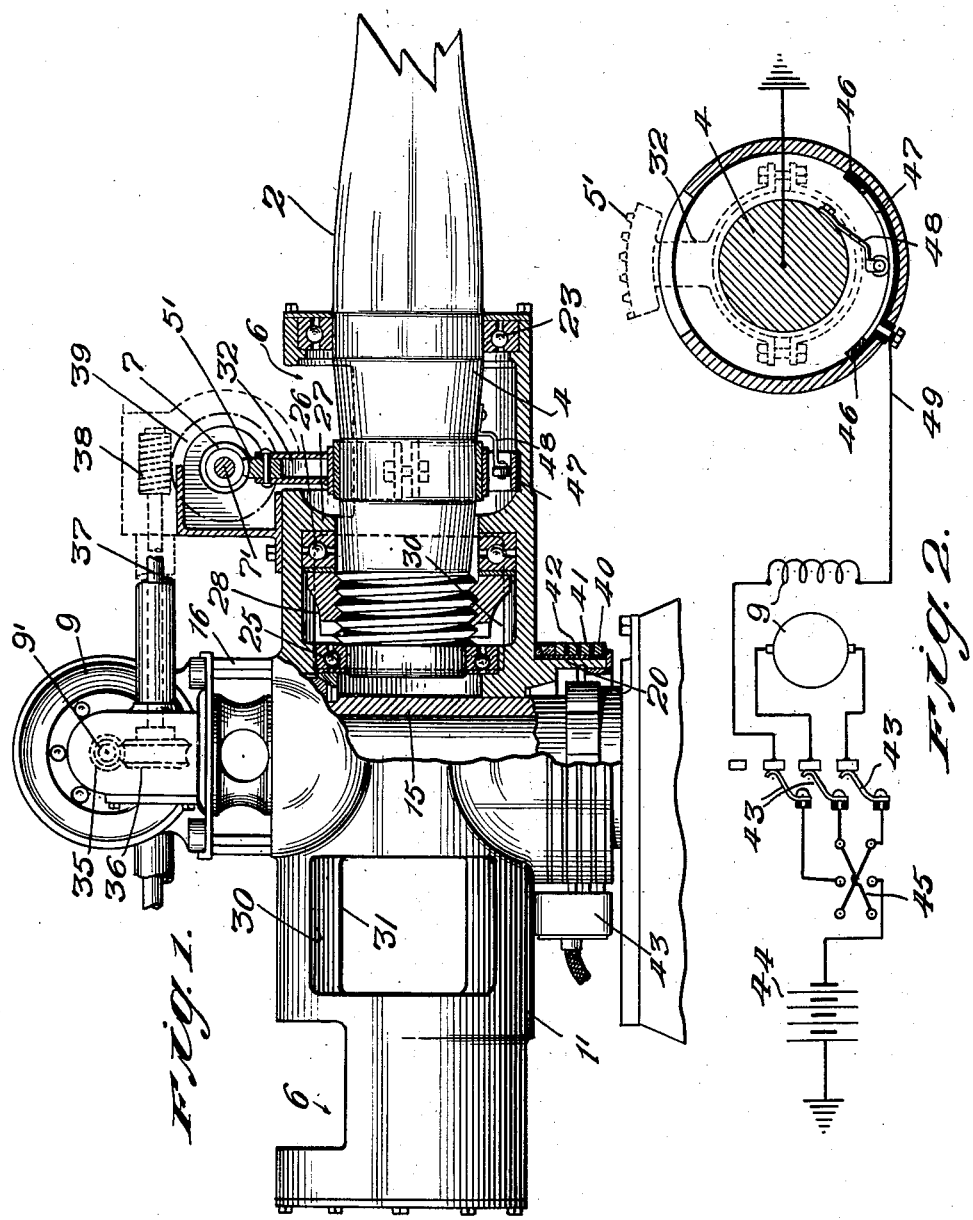

1,793,653

UNITED STATES PATENT OFFICE

WALLACE R. TURNBULL, OF GARDEN CITY, NEW YORK

VARIABLE-PITCH PROPELLER

Application filed June 14, 1929. Serial No. 370,764.

This invention relates to variable pitch propellers and particularly variable pitch propellers having associated therewith a motor pitch adjusting mechanism as a unit, as, for example, an electric motor and gearing means therebetween and the blades.

The object of the invention is a propeller unit of this character with the pitch altering mechanism and the control therefor so arranged and correlated with reference to the variable pitch propeller blades and the torque required to adjust them under different operating conditions that should the pitch adjustment be carried beyond predetermined points of control with the propeller operating at certain speeds, the control is automatically taken from the pilot who will thereafter be required to reduce the speed of the propeller in order to resume control of the pitch adjustment. A further object of the invention is a means for preventing the locking of the pitch adjusting motor mechanism or the injury thereof by careless manipulation.

For a better understanding of the invention reference may be had to the accompanying drawings illustrating one embodiment of the invention wherein:

Fig. 1 is a side view of a propeller unit embodying the invention with certain parts broken away, and Fig. 2 is a diagrammatic view indicating the control circuits.

Referring to the drawings, I have shown my invention as embodied in a propeller unit of the character set forth and described in an application Serial No. 372,288, filed on June 20, 1929, though it may be embodied in other forms of variable pitch propeller. This propeller includes a hub 1' having variable pitch blades 2 with blade shanks 4 journaled in oppositely disposed sockets formed in the propeller hub. The hub is provided with an opening for the reception of the stub drive shaft 15 and is provided with an extension 16 concentric with the axis of the stub shaft 15 upon which extension 16 is mounted a pitch adjusting motor 9, the latter being disposed crosswise of the shaft and symmetrically thereabout with the motor shaft 9' disposed at right angles to and passing through the axis of the stub drive shaft. Each blade 2 has its shank 4 journaled in its socket by means of three bearing units 23, 25 and 26, the latter being an intermediate thrust bearing for taking up the centrifugal force of the propeller blades. This thrust bearing 26 is retained by an inwardly extending annular flange 27 and the tightening nut 28 screw-threadedly attached to the shank of the blade. The hub is provided with a pair of openings 30 on the opposite sides of the axis of the stub shaft and disposed in the plane of rotation of the propeller blades 2, each opening 30 being disposed on the trailing side of the blade on that side of the axis. Diametrically opposite these openings 30 are disposed smaller openings 31 and these openings are properly adjusted to provide for the balance of the forces as more particularly set forth in the application above enumerated. The openings 30 also enable the thrust bearing unit 26 and the ball bearing unit 25 and other parts of the shank bearing parts to be inserted and assembled in position when a single integral piece hub is utilized. The hub is provided with a pair of openings 6 placed at 90° from the openings 30 and 31 for the purpose of accommodating gear segment carrying arms 32, the latter being fastened to the shanks 4 and carrying segmental worm gears 5' for gearing to the motor 9. The gearing means include a pair of parallel shafts 37 each carrying a worm wheel 36 which meshes with a worm 35 on the end of the motor shaft. The shafts 37 at their other ends carry worms 38 which in turn mesh with worm wheels 39 on shafts 7', the latter carrying worms 7 meshing with the segments 5'. The motor 9 is reversible and is controlled through the slip or collecting rings 40, 41 and 42 which are carried by a sleeve extension 20 from the hub. On the inner side of the hub 1' I have indicated at 43 any suitable system of collecting brushes. At 44 I have indicated a source of power and at 45 I have indicated a reversing switch which may be utilized for connecting and reversing the motor 9, the latter, for example, being of the series type.

It is desirable that through a certain range of adjustment of blades the power of the motor 9 remains unreduced and sufficient to rotate the blades 2 in the sockets of the propeller under all conditions of operation, but beyond these limits it is desirable that the available power be so reduced automatically as to render the pitch adjusting means unable to actuate the blades 2, except under predetermined speed and friction conditions, so as to compel the pilot to comply with these conditions before he can again regain control, if he has once lost this control by inattention or otherwise. Accordingly I have introduced in the circuit of the motor 9 resistances 46 which are automatically cut in circuit when the actuation of the blades is carried beyond the predetermined arrangement in either direction. These resistances are not sufficient to render the motor incapable of adjusting the pitch of the blades 2 under all conditions, but only under certain specified and predetermined conditions, the pilot being able to resume control by complying with the permissible conditions. It is obvious that many variations of the control means may be made. In the particular embodiment shown, I have diagrammatically indicated resistances 46 as forming a continuation of a metallic arc-shaped ring 47 with which the roller or brush 48, which is grounded to the shank 4 of the blade 2 contacts, the metallic contact member 47 being connected, as indicated, with the field of the motor 9. The resistances 46 may be of carbon or copper carbon or other suitable resistance material, or they may be composed of a fine wire winding or the like attached to the arc-shaped blade 47. These resistance elements 46, as indicated, are purposely diagrammatically shown and it is understood that any suitable resistance material or any suitable form or arrangement of such control resistances may be employed. The operation of the control is as follows:

For the normal blade angles that will normally be required in the use of propellers the finger or brush 48 is so mounted as to remain on the metallic arc-shaped member 47 of the control, but, if through inadvertence or accident the blades are rotated by the electric motor beyond the intended angle or range on either side of the range indicated by the arc-shaped ring 47, then the brush 48 will contact with a resistance 46 thereby reducing the power of the motor according to the desired extent, the electric motor coming to a complete stop under predetermined operating conditions of the propeller. If, after this has happened the pilot of the airplane, airship or the like should again wish to alter the angle of the propeller blades he must so reduce the driving speed of the engine that turns the propeller that the centrifugal force acting on the propeller blades will be very much lessened and to such an extent that the electric motor 9 will be able to again actuate the propeller blades, notwithstanding the reduced power thereof. When the blades again turn to the unimpeded range with the brush 48 engaging the metallic member 47 the action will be again normal and the speed of the propeller may be again increased beyond these limits. Preferably cooperating with the combined resistances and friction or speed control there is a mechanical stop which comes into operation to arrest the electric motor pitch adjusting mechanism if the adjustment is continued beyond the limits of the control 46. Such a mechanical stop in the particular embodiment shown consists of the arms 32 which carry the segmental gears 5' which engage the sides of the openings 6 provided in the propeller hub, the arms 32 serving the double purpose of the mechanical arresting means and the means for carrying the segmental gears for gearing the motor to the blades.

In the particular embodiment shown, I have indicated the blades as being adjustable through angles less than that required for full feathering and reversing positions, but if desired means may be devised for adjusting through to these positions.

I claim:

1. In a variable pitch propeller the combination of an electric motor for adjusting the pitch of the propeller blades, said motor when operating at full power being capable of actuating the blades under all conditions of operation of the propeller with means for automatically reducing the power supplied to the electric motor at one or more points in the range of adjustment thereof to render the motor capable of actuating the variable pitch blades only under reduced frictional operating conditions of the propeller.

2. In a propeller of the character set forth in claim 1 wherein the means for reducing the power includes a resistance which is automatically inserted by the rotating propeller blade at a certain point in the range of adjustment.

3. In a propeller of the character set forth in claim 1 wherein the electric motor is reversible and the means for reducing the power thereof includes resistances which are automatically insertable at the extreme ends of the range of adjustment.

4. In a propeller of the character set forth in claim 1 wherein the electric motor is reversible and the means for reducing the power thereof includes resistances which are automatically insertable at the extreme ends of the range of adjustment, said resistances being gradually increased with further adjustment of the blades beyond the predetermined range.

5. A variable pitch propeller including a pitch adjusting motor mechanism for adjusting the propeller blades through a certain predetermined range, and means for reducing the power of the motor adjusting mechanism at a predetermined point in the range of adjustment to a predetermined point below that required for rotating the propeller blades under certain predetermined operating conditions.

6. A propeller of the character set forth in claim 5 wherein the motor is of the electric type with gearing between the motor and the variable pitch blades, and the means for reducing the power of the motor includes a resistance which is correlated with reference to the motor and the torque required for rotating the blades under different operating conditions.

7. A variable pitch propeller having associated therewith an electric motor and system of gearing for rotating the propeller blades to vary their pitch, said motor being capable when operating at full power of adjusting the blades under all conditions of operation of the propeller, and means for reducing the power of said adjusting motor to a predetermined point at a predetermined point in the range of adjustment to render the motor incapable of actuating the propeller blades under predetermined conditions of operation, but still capable of actuating the blades under reduced speed conditions of the propeller.

8. The combination of a variable pitch propeller with a motor for actuating the blades for adjustment in pitch through a certain range, and means automatically controlled by the adjustment of the blades for reducing the power of the motor at a certain predetermined point in said range to a predetermined fixed value.

9. The combination of a variable pitch propeller with an electric motor for actuating the blades for adjustment in pitch, and means under the control of a swivelling blade for inserting resistance in the motor circuit at a predetermined point in the adjustment.

In testimony whereof I have signed my name to this specification.

WALLACE R. TURNBULL.